July 7, 1959  W. P. SCHMITTER  2,893,224
SHAFT COUPLING
Filed Dec. 4, 1957

INVENTOR.
Walter P. SCHMITTER
BY
Attorneys

United States Patent Office 2,893,224
Patented July 7, 1959

2,893,224

SHAFT COUPLING

Walter P. Schmitter, Wauwatosa, Wis., assignor to The Falk Corporation, Milwaukee, Wis., a corporation of Wisconsin Application December 4, 1957, Serial No. 700,632

4 Claims. (Cl. 64—14)

The invention relates to shaft couplings and more particularly to a power transmission shaft coupling of the type in which an elastic metal grid element is interposed between a pair of toothed members.

The use of a corrugated elastic metal grid element between an externally convex-toothed gear structure connected to one shaft member of the coupling and an internally convex-toothed gear structure connected with another member of the coupling has been heretofore suggested. With such a coupling the contact stress on the grid is computed by the formula $$Sc \text{ (unit compressive stress)} = .591 \sqrt{P \times E \frac{R1+R2}{R1 \times R2}}$$

where $E$=modulus of elasticity, $P$ is the total load in pounds, $R1$=convex-radius of the tooth and $R2$ the convex-radius of the contacting grid. The presence of the plus sign in this formula means that the contact stress at the mesh points between the grid and the toothed members is considerable, and this is highly objectionable. It is the object of this invention to provide an improved toothed type grid coupling structure in which the teeth of the internal and external gear elements contacting with a convexly curved grid are concavely curved so that the contact stress at the mesh portions is considerably decreased and determined by the formula $$Sc \text{ (unit compressive stress)} = .591 \sqrt{P \times E \frac{R1-R2}{R1 \times R2}}$$

in which $E$=modulus of elasticity, $P$ is the total load in pounds, $R1$=concave radius of the tooth and $R2$=convex radius of spring (or grid).

A further object of this invention is to provide in a coupling of the type above described a wide span between the points of oscillation of the shaft members relative to the cooperative connecting member, the distance of these points from the end of each shaft being at least equal to the diameter of the shaft being driven so that the angularity of the shell or connecting member relative to the shafts is minimized when radial misalinement is encountered, and in this connection to dispose the intermeshed grid and toothed element adjacent these points of oscillation so that said elements are likewise widely spaced from the juxtaposed end of the shafts being driven.

The invention further consists in the several features hereinafter set forth and more particularly defined by claims at the conclusion hereof.

Figure 1:
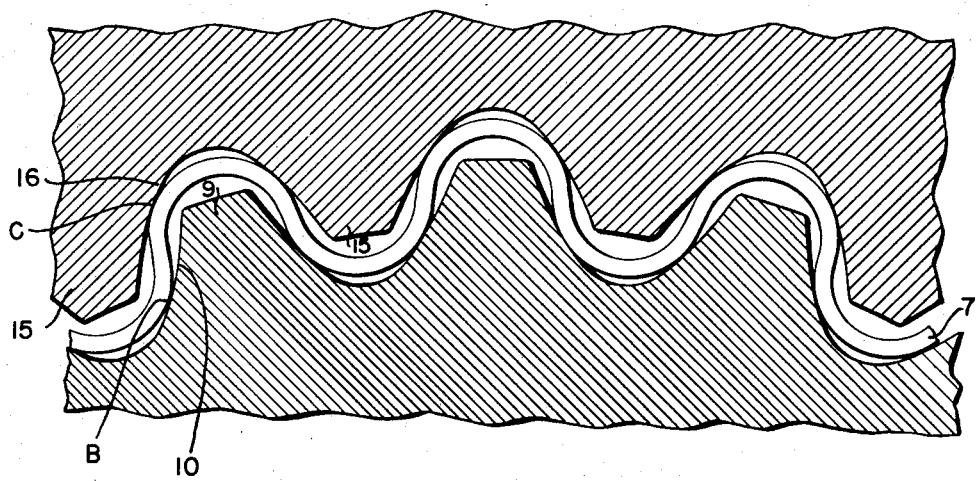
Fig. 1 is an enlarged detailed vertical sectional view taken on the line 1—1 of Fig. 2.
Figure 2:
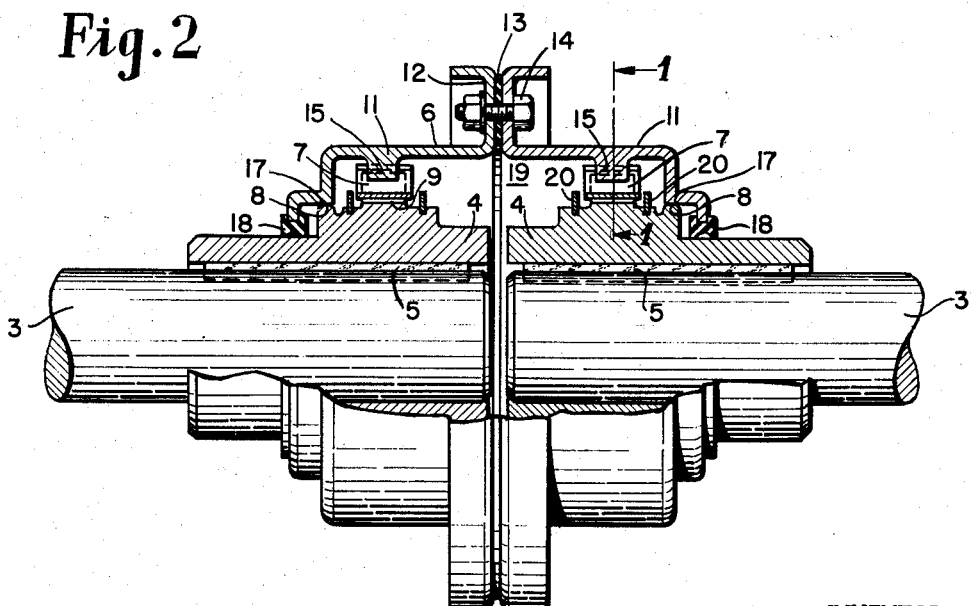
Fig. 2 is a vertical sectional view through a coupling embodying the invention.

Referring to the drawings, the numeral 3 designates the transmission shafts to be coupled together, 4 a coupling member having keyed connection at 5 with its associated shaft, and 6 a shell or connecting sleeve coupling member which is operatively connected to each of the members 4 by a corrugated elastic spring metal grid element 7 which is in the form of a continuous split band.

Each of the coupling members 4 has an annular shell contacting bead 8 formed thereon and an external toothed portion 9 adjacent said bead. The toothed portion 9 is formed of radially disposed, equi-distantly circumferentially spaced teeth whose contact surfaces 10 are concavely curved.

The shell or connecting coupling member 6 consists of two similar parts 11 having inner annularly flanged ends 12 that are connected together in abutting relation with a compressible sealing ring insert 13 by a series of radially disposed bolts 14 (one being shown). Each part 11 has an internally toothed portion 15 formed thereon to aline with the cooperative tooth portion of its associated member 4 when in operative position. The toothed portion 15 is formed of radially disposed, equi-distantly circumferentially spaced teeth whose contact surfaces 16 are concavely curved.

The toothed portion 9 of one shaft member is adapted to be intermeshed in spaced relation with the toothed portion 15 of its cooperative part 11 so that the grid element 7 may be disposed in this space in working relation with the teeth of said portions and so that a portion of this grid contacts at B with the concave surface 10 of one of the external teeth of the toothed portion 9 and contacts at C with the concave surface 16 of one of the internal teeth of the toothed portion 15 so that the drive from one shaft 3 to the other shaft will be from the toothed portion 9 of one coupling 4 through the grid 7 to one toothed portion of the connecting coupling 6 and through the other toothed portion of said coupling 6 through the grid 7 to the toothed portion 9 of the other coupling 4, the elasticity of the grid permitting within predetermined limits a radial displacement of one shaft 3 relative to the other, this displacement being permitted by the bearing engagement of the beads 8 of the coupling members 4 with annular portions 17 of each of the parts 11.

It is to be noted that the beads 8 on the members 4 are spaced from the inner ends of the shafts 3 a distance at least equal (in the present instance somewhat greater) than the diameter of the shafts so that the angularity between the connecting member and a shaft is minimized when radial misalinement is encountered and that the toothed-grid connections between the cooperative coupled members are disposed directly adjacent said beads 8 to minimize the gear displacements of said members when radial misalinement occurs.

Each part 11 is provided with a yieldable or suitable rubber composition sealing ring 18 engageable with its associated shaft so that a sealed space 19 is provided for a suitable liquid lubricant or a grease lubricant.

Each of the grid elements 7 is confined to work between their associated toothed members by means of spaced retainer rings 20.

The unit compressive stress on the grids with the construction above described is determined by the formula $$.591 \sqrt{P \times E \frac{R1-R2}{R1 \times R2}}$$

and in considerably less than that of prior designs of couplings of this general type.

I desire it to be understood that this invention is not to be limited to any particular form or arrangement of parts except in so far as such limitations are included in the appended claims.

What I claim as my invention is:

1. In a coupling for a drive shaft and a driven shaft, the combination of a pair of externally toothed coupling members, one member for each shaft, a connecting member supported at its ends on said first named members and having internally toothed portions intermeshing in spaced relation with the teeth of said first named members, the teeth of all of said members being concavely curved, and flexible curvedly corrugated grid elements mounted in the spaces between the cooperative internally and externally toothed coupling members in driving relation between their convex surfaces and the concavely curved sides of the teeth of said coupling members.

2. In a coupling for a drive shaft and a driven shaft, the combination of a pair of externally toothed coupling members, one member for each shaft, a connecting member having internally toothed portions intermeshing in spaced relation with the teeth of said first named members, and a flexible curvedly corrugated grid element interposed in driving relation between said intermeshing portions, the teeth of said members and the contacting surfaces of said grid element being formed so that the unit compressive stress of the grid element is equal to $$.591\sqrt{P \times E \frac{R1-R2}{R1 \times R2}}$$

where P is the total load in pounds, E is the modulus of elasticity of the grid element, R1 is the contacting radius of a tooth of either toothed element and R2 is the contacting radius of the grid element.

3. In a coupling for a drive shaft and a driven shaft, a pair of coupling members, one member for each shaft and having a beaded portion spaced from the end of its associated shaft at a distance at least equal to the diameter of this shaft and having an externally toothed portion adjacent said beaded portion, a connecting sleeve member having its opposite end portions riding on said beaded portions and internally toothed portions intermeshing in spaced relation with the externally toothed portions of said first named members, and a flexible corrugated metal grid element disposed between each of said spaced intermeshing toothed portions in driving contact therewith.

4. The coupling structure as defined in claim 3, wherein spaced retainer rings on each of said pair of coupling members limit axial movement of the grid elements relative to said members.

References Cited in the file of this patent

UNITED STATES PATENTS

| | | |
|---|---|---|
| 1,356,860 | Fast | Oct. 26, 1920 |
| 1,666,445 | Fast | Apr. 17, 1928 |
| 2,737,033 | Bendall | Mar. 6, 1956 |